United States Patent
Okubo et al.

(10) Patent No.: US 7,295,915 B1
(45) Date of Patent: Nov. 13, 2007

(54) METHOD FOR COMPENSATING FOR ACCESSORY LOADING

(75) Inventors: Shunsuke Okubo, Belleville, MI (US); Fazal Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/381,008

(22) Filed: May 1, 2006

(51) Int. Cl.
*F02D 29/06* (2006.01)
*F02N 11/08* (2006.01)

(52) U.S. Cl. .................... 701/110; 123/179.4; 180/65.2

(58) Field of Classification Search ................ 701/101, 701/102, 107, 110–115; 180/65.2–65.6; 123/179.3, 179.4
See application file for complete search history.

(56) References Cited

U.S. PATENT DOCUMENTS

| | | | |
|---|---|---|---|
| 4,510,396 A * | 4/1985 | Uchida et al. ............ 290/30 R |
| 5,365,445 A | 11/1994 | Takizawa | |
| 6,018,199 A * | 1/2000 | Shiroyama et al. ....... 290/37 A |
| 6,336,335 B2 | 1/2002 | Ota et al. | |
| 6,367,570 B1 * | 4/2002 | Long et al. ................ 180/65.2 |
| 6,396,165 B1 * | 5/2002 | Nagano et al. ............ 307/10.6 |
| 6,524,224 B2 | 2/2003 | Gagnon et al. | |
| 6,615,797 B2 | 9/2003 | Richard et al. | |
| 6,742,497 B1 | 6/2004 | Kanamaru et al. | |
| 6,769,399 B2 * | 8/2004 | Darnell ................. 123/339.19 |
| 6,825,575 B1 | 11/2004 | Edelson | |
| 6,895,769 B2 | 5/2005 | Okawara et al. | |
| 7,013,213 B2 * | 3/2006 | McGee et al. ............. 701/113 |
| 7,117,964 B1 * | 10/2006 | Kuang et al. ............. 180/65.3 |

FOREIGN PATENT DOCUMENTS

EP       0767085 B1    12/1999

* cited by examiner

*Primary Examiner*—Stephen K. Cronin
*Assistant Examiner*—Johnny H. Hoang
(74) *Attorney, Agent, or Firm*—David B. Kelley; Brooks Kushman P.C.

(57) ABSTRACT

An internal combustion engine includes an advanced vehicle system controller (VSC) that calculates a total power demand to meet a driver wheel power demand plus any accessory loads and independently schedules an engine speed and load operating point to meet the total power demand. A reduction in available engine brake power that is not associated with a driver input, and would ordinarily cause the VSC to respond by raising engine speed, is detected. The driver wheel power demand is reduced to compensate for the reduction in available engine brake power such that the VSC does not need to raise engine speed to meet the driver wheel power demand. A magnitude of the reduction may be determined according to a calibration map to allow a trade off to be made between driveability and noise, vibration, and harshness.

20 Claims, 4 Drawing Sheets

METHOD FOR COMPENSATING FOR ACCESSORY LOADING

BACKGROUND OF THE INVENTION

1. Field of the Invention

The invention relates to an internal combustion engine which includes an advanced vehicle system controller (VSC) that calculates the total engine power needed to meet the driver demand plus all accessory loads and independently schedules the engine speed and load operating point, with or without feedback of actual engine performance, to meet the total power demand.

2. Background Art

In an existing internal combustion engine including an advanced vehicle system controller (VSC), the VSC calculates the total engine power needed to meet the driver wheel power demand plus all accessory loads, and independently schedules the engine speed and load operating point, with or without feedback of actual engine performance, to meet the total power demand. By scheduling the most efficient engine speed and load operating point, the VSC may attempt to maximize fuel economy. Examples of powertrain systems which may involve VSCs include continuously variable transmission (CVT) and power split hybrid applications.

In an existing hybrid electric vehicle including such a VSC, the engine speed can flare up by 1,000 rpm when the air conditioner (A/C) compressor clutch engages. When the A/C compressor clutch disengages, the engine speed falls by 1,000 rpm. This engine speed cycling would typically occur at higher altitudes where the engine is running at wide open throttle (WOT). If the hybrid electric vehicle runs the engine at WOT at lower altitudes, then engine speed cycling at lower altitudes can also occur. The compressor clutch engaging and disengaging is driven by low and high pressure cut-out switches in the A/C system. Accordingly, the A/C compressor clutch cycles independently of the climate control panel's mode selector switch and the driver's accelerator pedal position. As such, the changes in engine speed are not associated with a driver input. Therefore, this engine speed behavior may be intrusive and disturbing to the operator of the vehicle.

In the existing hybrid electric vehicle, the engine speed flare up is a result of the VSC's response to a reduction in available engine brake power caused by the A/C compressor clutch engagement. Put another way, the VSC calculates the total engine power needed to meet the driver demand plus all accessory loads and independently schedules the engine speed and load operating point to meet the total power demand. The engaging of the A/C compressor clutch increases the accessory load, thus increasing the total power demand. When the engine is operating at WOT, in order to maintain the driver's requested wheel power output and the high voltage battery charge balance, the VSC must compensate for the power lost to the A/C system by raising the engine speed.

When the engine is not running at WOT, the VSC may respond to A/C cycling by adjusting the throttle position to increase or decrease the brake engine power as necessary. These throttle position adjustments are sufficient to make up the power consumed by the A/C system and the VSC does not need to increase the engine speed. However, at higher elevations, the VSC runs the engine at wide open throttle (WOT) frequently so that the VSC responds to A/C compressor clutch engagements by increasing the engine speed.

In general, any change to engine brake power not associated with a driver input can cause the VSC to respond with an intrusive engine speed change.

For the foregoing reasons, there is a need for a method for controlling an internal combustion engine including an advanced vehicle system controller that addresses these engine speed flare ups.

SUMMARY OF THE INVENTION

In accordance with the invention, in an internal combustion engine including an advanced VSC that calculates the total engine power needed to meet the driver demand plus all accessory loads and independently schedules the engine speed and load operating point, the driver demanded wheel power is reduced (for example, by reducing driver demanded wheel torque) to compensate for the power consumed by the A/C compressor so that the VSC no longer needs to raise the engine speed to maintain the high voltage battery charge balance. It is appreciated that reducing the driver demanded wheel power in accordance with the invention may be used to compensate for any change to engine brake power not associated with a driver input that ordinarily would cause the VSC to respond with an intrusive engine speed change. Such changes may include electrical loads (for example, an electric A/C system or any other electric load) because in order to maintain battery charge neutrality it would ordinarily be necessary to increase engine speed to make up for the electric load. Further, it is appreciated that the invention is applicable to any advanced VSC; examples of powertrain systems that may have such VSCs include continuously variable transmission (CVT) and power split hybrid applications.

This reduction in driver demanded wheel power is preferably only allowed when the engine is at wide open throttle, minimum vehicle speed and maximum driver demand power thresholds are satisfied, and the wheel power reduction is transparent to the driver. Hysteresis should be applied to these conditions to prevent dithering. Further, it is preferred that the wheel power reduction be applied and removed smoothly through a software filter.

In more detail, an electronic throttle control feature may determine whether or not the engine is at wide open throttle. Specifically, the electronic throttle control feature examines the ambient barometric pressure, throttle opening, mass airflow sensor output and engine speed to infer whether or not additional throttle opening would result in more engine torque. If more torque is not possible, a flag is set to notify the VSC that the engine is operating at wide open throttle. The VSC should use this flag as a necessary condition to reduce the driver demanded wheel power. Further, other methods of determining wide open throttle may be used, including direct measurement of barometric pressure and manifold pressure.

In a preferred implementation, the magnitude of the wheel power adjustment is determined by a calibration mapping. In this A/C example, the mapping tabulates compressor power usage at various engine speeds and refrigerant pressures. Additional tables can be used to map other adjustments to prevent unwanted engine speed changes.

DETAILED DESCRIPTION OF THE PREFERRED EMBODIMENT

Figure 1:
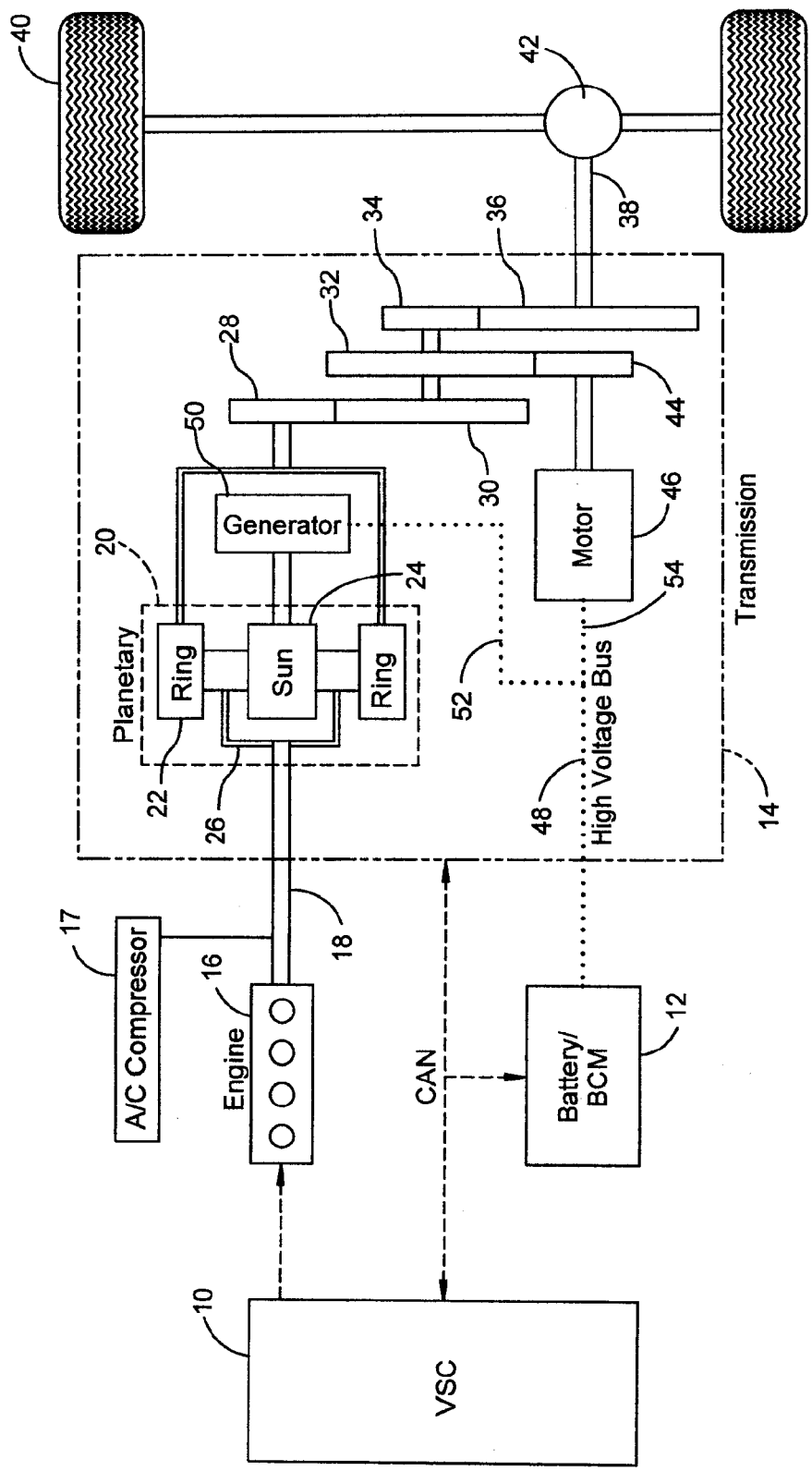
FIG. 1 is a schematic representation of a power split powertrain system configuration.

A hybrid electric vehicle powertrain is shown in FIG. 1. A vehicle system controller (VSC) 10, a battery and battery control module (BCM) 12, and a transmission 14, together with a motor-generator subsystem, comprise a control area network (CAN). An engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor in a known fashion as shown at 52.

The power split powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50 and the battery 12, where the battery 12 acts as an energy storage medium for the generator 50 and the motor 46.

In general, VSC 10 calculates the total engine power needed to meet the driver wheel power demand plus all accessory loads (for example, A/C compressor 17), and independently schedules the engine speed and load operating point, with or without feedback of actual engine performance, to meet the total power demand. This type of approach is typically used to maximize fuel economy and may be used in other types of powertrain systems that have such VSCs including CVT and other hybrid applications.

Figure 2:
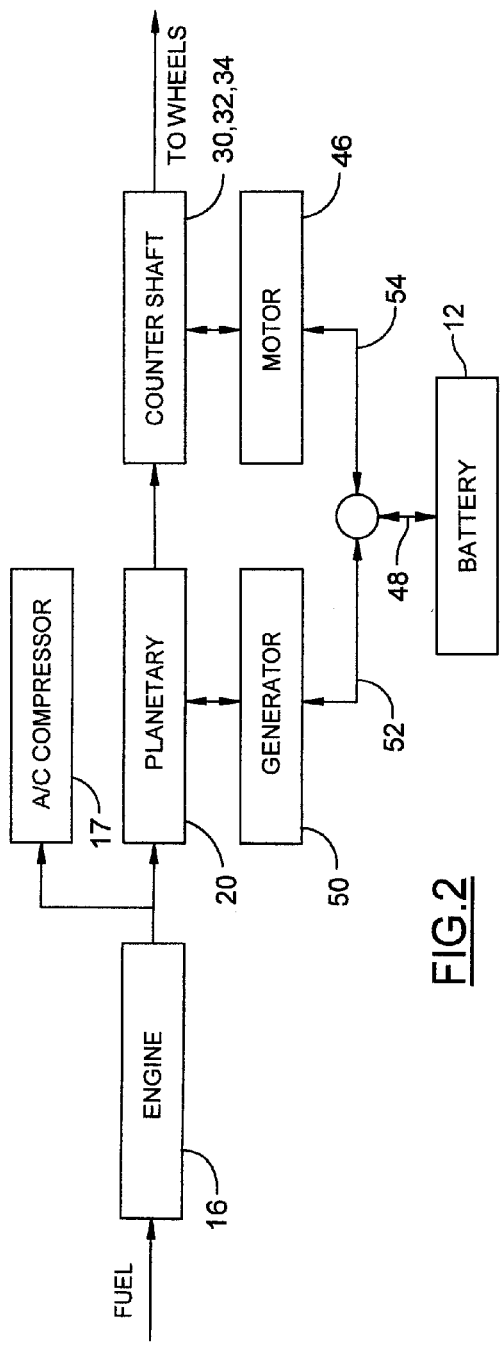
FIG. 2 is a schematic representation, in block diagram form, of a powertrain system power flow diagram.

The power flow paths between the various elements of the power split powertrain diagram shown in FIG. 1 are illustrated in FIG. 2. Fuel is delivered to the engine 16 under the control of the operator in a known fashion using an engine throttle. Engine 16 delivers power to the planetary gear unit 20. The available engine brake power is reduced by accessory loads such as A/C compressor 17. Power is delivered from the planetary ring gear to the countershaft gears 30, 32, 34. And, power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3A:
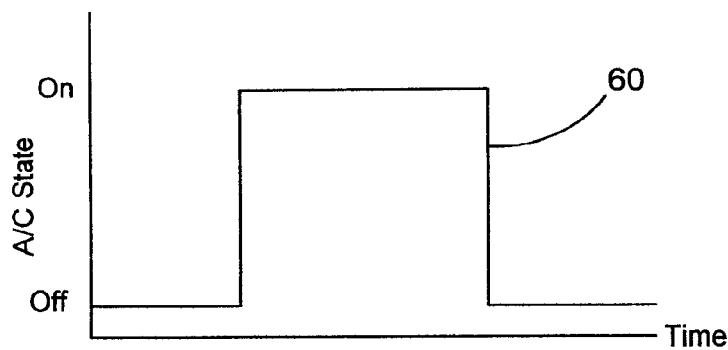
FIGS. 3a, 3b, and 3c depict A/C state, engine speed, and driver demanded power, illustrating the reduction of driver demanded wheel power in response to the reduction in available engine brake power caused by the A/C compressor clutch engagement.
Figure 3B:
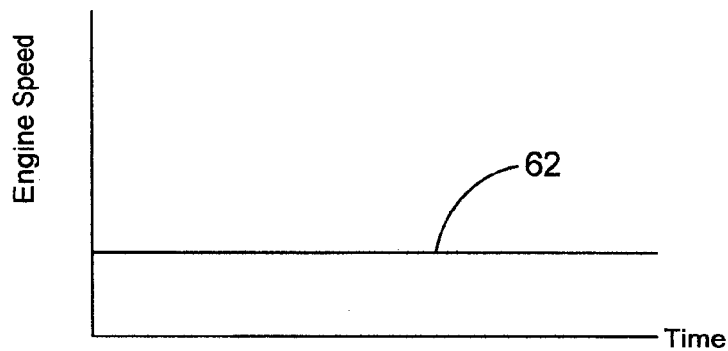
Figure 3C:
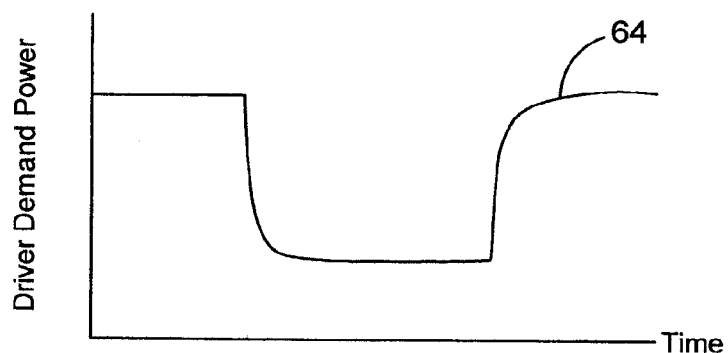

In accordance with the invention, which is applicable to any advanced VSC, to avoid engine speed flare up at wide open throttle when the A/C compressor clutch engages or when any other change to available engine brake power not associated with a driver input occurs, driver demanded wheel power is reduced subject to certain exceptions. FIGS. 3a, 3b, and 3c illustrate exemplary system behavior in accordance with the invention. FIG. 3a, at 60, shows the A/C compressor clutch engaging and then subsequently disengaging. FIG. 3b, at 62, shows the engine speed staying constant, while FIG. 3c, at 64, shows the wheel power being reduced. In this way, a reduction in demanded wheel power by the power consumed by the A/C compressor keeps the total power demand from increasing so that the VSC does not need to raise the engine speed to maintain the high voltage battery charge balance.

The wheel power reduction should only be allowed when the engine is at wide open throttle, minimum vehicle speed and maximum driver demand power thresholds are satisfied, and the wheel speed reductions are transparent to the driver. Further, hysteresis is applied to these conditions to prevent dithering. Still further, the wheel power reduction should be applied and removed smoothly through a software filter.

Figure 4:
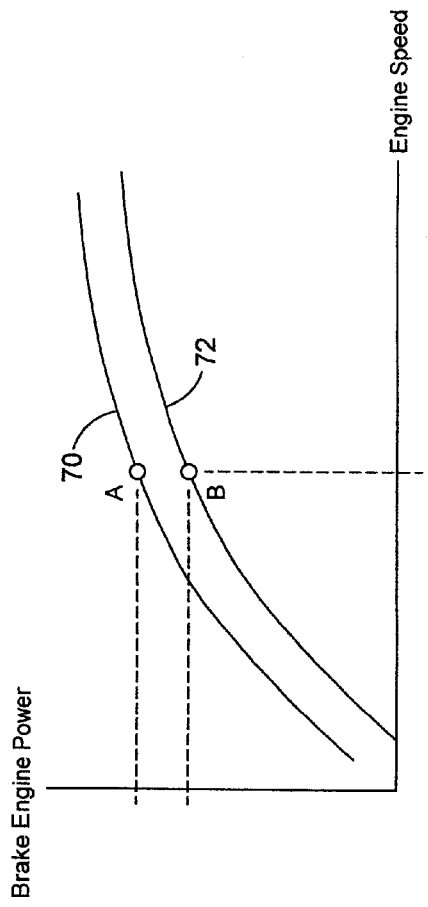
FIG. 4 is a graph depicting engine brake power versus engine speed, showing the A/C compressor engagement lowering the engine brake power curve.

As further illustrated in FIG. 4, available brake engine power versus engine speed when the A/C compressor clutch is disengaged is shown at curve 70. When the A/C compressor clutch engages, the available brake power curve moves downward to 72. On curve 70, the engine operates at point A. On curve 72, driver demanded wheel power is reduced such that the engine operates at point B, preventing the engine speed from changing.

As mentioned previously, the wheel power reduction should only occur when the engine is at wide open throttle. Whether or not the engine is at wide open throttle (WOT) may be determined by existing logic in the electronic throttle control feature that examines ambient barometric pressure, throttle opening, mass airflow sensor output and engine speed to infer whether or not additional throttle opening will result in more engine torque. In the event that the engine is not operating at WOT, the throttle may be opened further to provide more engine torque instead of reducing driver demanded wheel power. However, when operating at WOT, driver demanded wheel power should be reduced in response to the change in available engine brake power.

Figure 5:
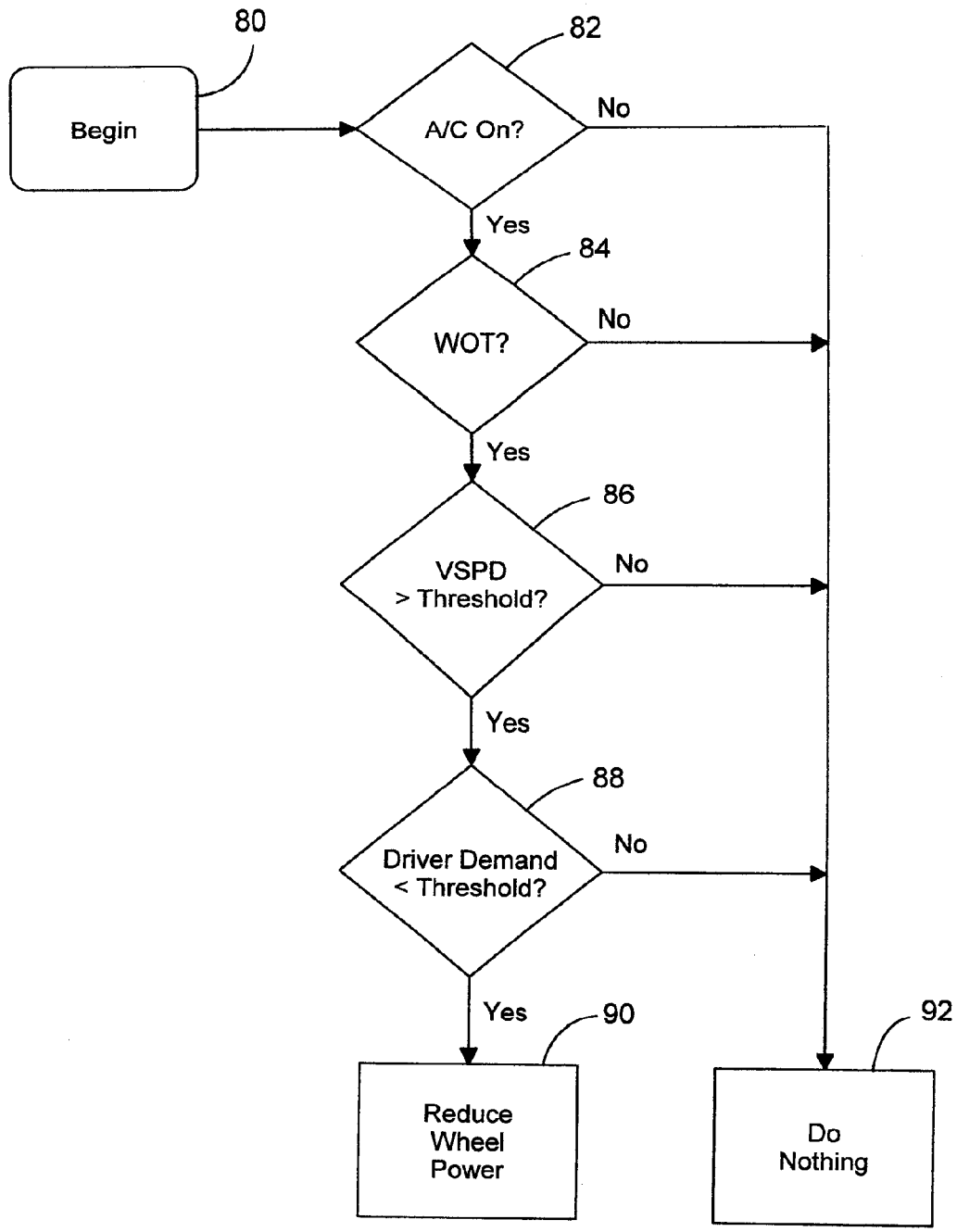
FIG. 5 is a block diagram illustrating an implementation of the control logic for reducing driver demanded power.

FIG. 5 illustrates a flow diagram of the invention. Flow begins at block 80. At decision block 82, it is determined whether or not the A/C compressor clutch is engaged. As depicted at block 92, no adjustment is necessary when the A/C compressor clutch is disengaged. At decision block 84, no adjustment to driver demanded wheel power is made unless the engine is at wide open throttle. Decision block 86 checks that vehicle speed is above a programmable threshold, while block 88 checks whether or not the driver is requesting full powertrain power (the driver is fully depressing the accelerator pedal). In the event that all conditions all satisfied, wheel power is reduced at block 90 to avoid engine speed flare up.

Preferably, the test conditions at decision blocks 84, 86 and 88 use hysteresis to prevent rapid toggling. As well, when wheel power is reduced at block 90, the reduction should be applied through a software filter so that the torque reduction is not overly abrupt.

With regard to the minimum vehicle speed threshold, the power needed to run the compressor is a larger percentage of the driver demanded wheel power at lower vehicle speeds. This could make wheel power adjustments more intrusive and introduce drivability problems. Accordingly, driver demanded wheel power is not reduced when the minimum vehicle speed threshold is not met. In addition, when the driver is requesting the maximum powertrain output, the VSC should not reduce the wheel torque for any reason.

The magnitude of the wheel power adjustment is determined by calibration mapping. In this A/C example, the mapping tabulates compressor power usage at various engine speeds and refrigerant pressures. Additional tables can be used to map other adjustments to prevent unwanted engine speed changes. Reducing the delivered wheel power independently of the driver's request is preferably performed in a way that is transparent to the driver. In the A/C compressor example, when the power needed to run the A/C compressor is a small percentage of the power being generated to drive the vehicle (5%-10%), the wheel power reduction has little impact on driveability. In other applications where the A/C power usage is a larger percentage of the driver demanded wheel power, the tables used to schedule the wheel power reduction could be calibrated smaller to minimize the drivability issue. This aspect of the invention allows a tradeoff to be made between driveability and noise, vibration, and harshness (NVH) concerns.

While the best mode for carrying out the invention has been described in detail, those familiar with the art to which this invention relates will recognize various alternative designs and embodiments for practicing the invention as defined by the following claims.

What is claimed:

1. A method of controlling an internal combustion engine which includes an advanced vehicle system controller (VSC) that calculates a total power demand to meet a driver wheel power demand plus any accessory loads and independently schedules an engine speed and load operating point to meet the total power demand, the method comprising:
    detecting a reduction in available engine brake power for meeting the driver wheel power demand that is not associated with a driver input and would ordinarily cause the VSC to respond by raising engine speed; and
    reducing the driver wheel power demand to compensate for the reduction in available engine brake power such that the VSC does not need to raise engine speed to meet the driver wheel power demand.

2. The method of claim 1 wherein the reduction in available engine brake power is due to engagement of an accessory load.

3. The method of claim 2 wherein the accessory load comprises an air conditioning compressor.

4. The method of claim 1 wherein the engine includes a power split hybrid powertrain.

5. The method of claim 1 further comprising:
    determining an existence of a wide open throttle condition; and
    only reducing the driver wheel power demand when the wide open throttle condition exists and the reduction in available engine brake power is detected.

6. The method of claim 5 wherein determining the existence of the wide open throttle condition comprises:
    determining whether or not additional throttle opening would increase available engine brake power.

7. The method of claim 1 further comprising:
    only reducing the driver wheel power demand when a minimum vehicle speed threshold is met and the reduction in available engine brake power is detected.

8. The method of claim 1 further comprising:
    only reducing the driver wheel power demand when a maximum driver demand power threshold is met and the reduction in available engine brake power is detected.

9. The method of claim 1 further comprising:
    applying the driver wheel power demand reduction as a filtered driver wheel power demand reduction to prevent abrupt driver wheel power demand changes.

10. The method of claim 1 wherein a magnitude of the reduction is determined according to a calibration map.

11. An internal combustion engine which includes an advanced vehicle system controller (VSC) that calculates a total power demand to meet a driver wheel power demand plus any accessory loads and independently schedules an engine speed and load operating point to meet the total power demand, the VSC being programmed to:
    detect a reduction in available engine brake power for meeting the driver wheel power demand that is not associated with a driver input and would ordinarily cause the VSC to respond by raising engine speed; and
    reduce the driver wheel power demand to compensate for the reduction in available engine brake power such that the VSC does not need to raise engine speed to meet the driver wheel power demand.

12. The engine of claim 11 wherein the reduction in available engine brake power is due to engagement of an accessory load.

13. The engine of claim 12 wherein the accessory load comprises an air conditioning compressor.

14. The engine of claim 11 wherein the engine includes a power split hybrid powertrain.

15. The engine of claim 11 wherein the VSC is further programmed to:
    determine an existence of a wide open throttle condition; and
    only reduce the driver wheel power demand when the wide open throttle condition exists and the reduction in available engine brake power is detected.

16. The engine of claim 15 wherein determining the existence of the wide open throttle condition comprises:
    determining whether or not additional throttle opening would increase available engine brake power.

17. The engine of claim 11 wherein the VSC is further programmed to:
    only reduce the driver wheel power demand when a minimum vehicle speed threshold is met and the reduction in available engine brake power is detected.

18. The engine of claim 11 wherein the VSC is further programmed to:
    only reduce the driver wheel power demand when a maximum driver demand power threshold is met and the reduction in available engine brake power is detected.

19. The engine of claim 11 wherein the VSC is further programmed to:
    apply the driver wheel power demand reduction as a filtered driver wheel power demand reduction to prevent abrupt driver wheel power demand changes.

20. The engine of claim 11 wherein a magnitude of the reduction is determined according to a calibration map.

* * * * *